(12) United States Patent
Kastelein et al.

(10) Patent No.: US 12,372,377 B2
(45) Date of Patent: Jul. 29, 2025

(54) MEASURE GRID GAS PRESSURE BY THE RESIDENTIAL GAS METER

(71) Applicant: Honeywell International Inc., Charlotte, NC (US)

(72) Inventors: Bastiaan Kastelein, Hippolytushoef (NL); Guido Temme, Bad Iburg (DE)

(73) Assignee: Honeywell International Inc., Charlotte, NC (US)

( * ) Notice: Subject to any disclaimer, the term of this patent is extended or adjusted under 35 U.S.C. 154(b) by 358 days.

(21) Appl. No.: 18/166,176

(22) Filed: Feb. 8, 2023

(65) Prior Publication Data
US 2024/0263978 A1 Aug. 8, 2024

(51) Int. Cl.
*G01D 4/00* (2006.01)
*G01F 1/50* (2006.01)
*G01F 15/063* (2022.01)
*G01L 19/00* (2006.01)

(52) U.S. Cl.
CPC ............ *G01D 4/00* (2013.01); *G01F 1/50* (2013.01); *G01F 15/063* (2013.01); *G01L 19/0092* (2013.01)

(58) Field of Classification Search
CPC .. G01D 4/00; G01F 1/50; G01F 15/06; G01F 15/061; G01F 15/063; G01L 19/0092; G01L 2019/0053
See application file for complete search history.

(56) References Cited

U.S. PATENT DOCUMENTS

| | | | |
|---|---|---|---|
| 8,857,456 B2 | 10/2014 | Monkowski et al. | |
| 11,402,247 B2 | 8/2022 | Lampe-Juergens et al. | |
| 2022/0136875 A1* | 5/2022 | Lampe-Juergens | G01F 15/185 73/861.42 |
| 2022/0136926 A1* | 5/2022 | Lampe-Juergens | G01M 3/2815 73/40 |
| 2022/0170773 A1 | 6/2022 | Lampe-Juergens et al. | |
| 2025/0021115 A1* | 1/2025 | Shao | H04L 67/12 |

FOREIGN PATENT DOCUMENTS

CN 111043631 A 4/2020

OTHER PUBLICATIONS

Fagiani, et al., "A Statistical Framework for Automatic Leakage Detection in Smart Water and Gas Grids", Energies, Aug. 2016, 9, 665 (25 pages total).

* cited by examiner

*Primary Examiner* — Paul M. West
(74) *Attorney, Agent, or Firm* — John Maldjian, Esq.; Stevens & Lee PC

(57) ABSTRACT

A system includes a gas meter to measure gas consumption and flow downstream for a gas regulator. The system also includes the gas regulator with an inlet connected to an upstream pipeline and an outlet connected to the gas meter. The system also includes a pressure sensor positioned within the gas meter to measure outlet pressure of the gas regulator. The gas meter is able to derive upstream pressure without an additional pressure sensor on an inlet side of the gas regulator by combining the measured gas flow and a measured regulator outlet pressure with a characterization curve of the gas regulator showing a relation between input pressure to the output pressure and to the gas flow.

20 Claims, 7 Drawing Sheets

300

310

Download a known regulator characterization table (outlet pressure vs flow vs inlet pressure) in the gas meter

320

At regular moments in time (e.g. every 2 minutes) measure outlet pressure with high precision, measure momentary gas flow, and interpolate in the characterization table to find the value for the inlet pressure

330

Archive measured values of outlet pressure, inlet pressure, gas flow combinations at a minimum flow during a set time interval (e.g. 1 hour); Archive measured values of outlet pressure, inlet pressure, gas flow combinations at a maximum flow during the same set time interval

340

Periodically (e.g. every 24 hours) send the archive of measured outlet pressure, inlet pressure and gas flow at the minimum flow and maximum flow to the utility system

510 — Download a characterization table of step flow outlet pressure response curves to the gas meter (outlet pressure vs time delta flow)

520 — Detect a step change in flow (gas consumption) when a burner starts or stops

530 — Measure dynamic response curve of outlet pressure vs time to this step change in gas consumption. he response curve depends on the inlet pressure

540 — Interpolate in characterization table to find the value for the inlet pressure

710
Collect inlet pressure and dynamic flow values from the gas meters in the gas distribution grid at a synchronized moment in time

720
Collect inlet pressure and inlet flow from the gas distribution station(s)

730
Compute simulated flow (or inlet pressure) at end points in the network by feeding inlet pressures (or flow) at a gas meter, and inlet pressure and flows from the gas distribution stations into a (CFD) simulation of the gas distribution network where topology and geometry data of all the piping has been entered

740
Look for gas meters with a large deviation between the simulated and reported flow (or simulated inlet pressure and reported inlet pressure)

750
Report a potential leak in the pipe segment to that gas meter

Figure 7

MEASURE GRID GAS PRESSURE BY THE RESIDENTIAL GAS METER

TECHNICAL FIELD

The present disclosure generally relates to detecting variances in gas regulators in relation to gas meters within a system.

BACKGROUND

Currently, the grid pressures for many regulators are not measured. In addition, there are also currently no low cost or cheap solutions for measuring the grid pressure at end points in a system. In addition, adding a pressure transmitter with a communication link to a utility system can be very expensive.

There is a need for a low-cost and efficient means to measure grid pressure at end points in a system. In addition, there is a need to be able to communicate efficiently with the utility system regarding the grid pressure within the system As such, there is a need to measure grid pressure in a system at a low cost. In addition, there is a need to be able to measure the grid pressure without the need for a pressure sensor near the gas regulator. Further, there is a need for a communication link to communicate stored and archived measurements from the gas meter to the gas utility system to identify leaks within the system.

SUMMARY

The aforementioned aspects and other objectives can now be achieved as described herein.

In an embodiment, a system includes a gas meter configured to measure gas consumption/gas flow downstream for a gas regulator. The system also includes the gas regulator configured with an inlet connected to an upstream pipeline and an outlet connected to the gas meter. The system also includes a pressure sensor positioned within the gas meter to measure outlet pressure of the gas regulator. The gas meter is able to derive upstream pressure without an additional pressure sensor on an inlet side of the gas regulator by combining the measured gas flow and a measured outlet flow with a characterization curve of the gas regulator showing a relation between input pressure to the outlet pressure and to the gas flow.

In an embodiment of the system, regulator inlet pressures are derived according to a first algorithm before a second or third algorithm.

In an embodiment of the system, regulator inlet pressures are derived according to a second algorithm in place of a first algorithm.

In an embodiment, a method includes configuring a gas meter to measure gas consumption/gas flow downstream for a gas regulator. The method also includes configuring the gas regulator with an inlet connected to an upstream pipeline and an outlet connected to the gas meter. The method also includes positioning a pressure sensor within the gas meter to measure outlet pressure of the gas regulator. The gas meter is able to derive upstream pressure without an additional pressure sensor on an inlet side of the gas regulator by combining the measured gas flow and a measured outlet flow with a characterization curve of the gas regulator showing a relation between input pressure to the output pressure and to the gas flow.

It is another aspect of the disclosed embodiments to provide for a sensor within a gas meter to detect anomalies in gas regulators in comparison to other gas regulators within the gas distribution network.

In an embodiment, the method also includes positioning a temperature sensor within the gas meter to measure changes and variances to gas temperatures at the end points to further identify internal leaking of the gas regulator and other gas regulators.

In an embodiment, the method also includes setting gas distribution stations with known flow and pressure feeding into a distribution network segment.

BRIEF DESCRIPTION OF THE FIGURES

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

FIG. 3 illustrates a flowchart of a first algorithm in accordance with an embodiment of the invention;

FIG. 5 illustrates a flowchart of a third algorithm in accordance with an embodiment of the invention;

FIG. 7 illustrates a flow chart in accordance with an embodiment of the invention.

Figure 1:
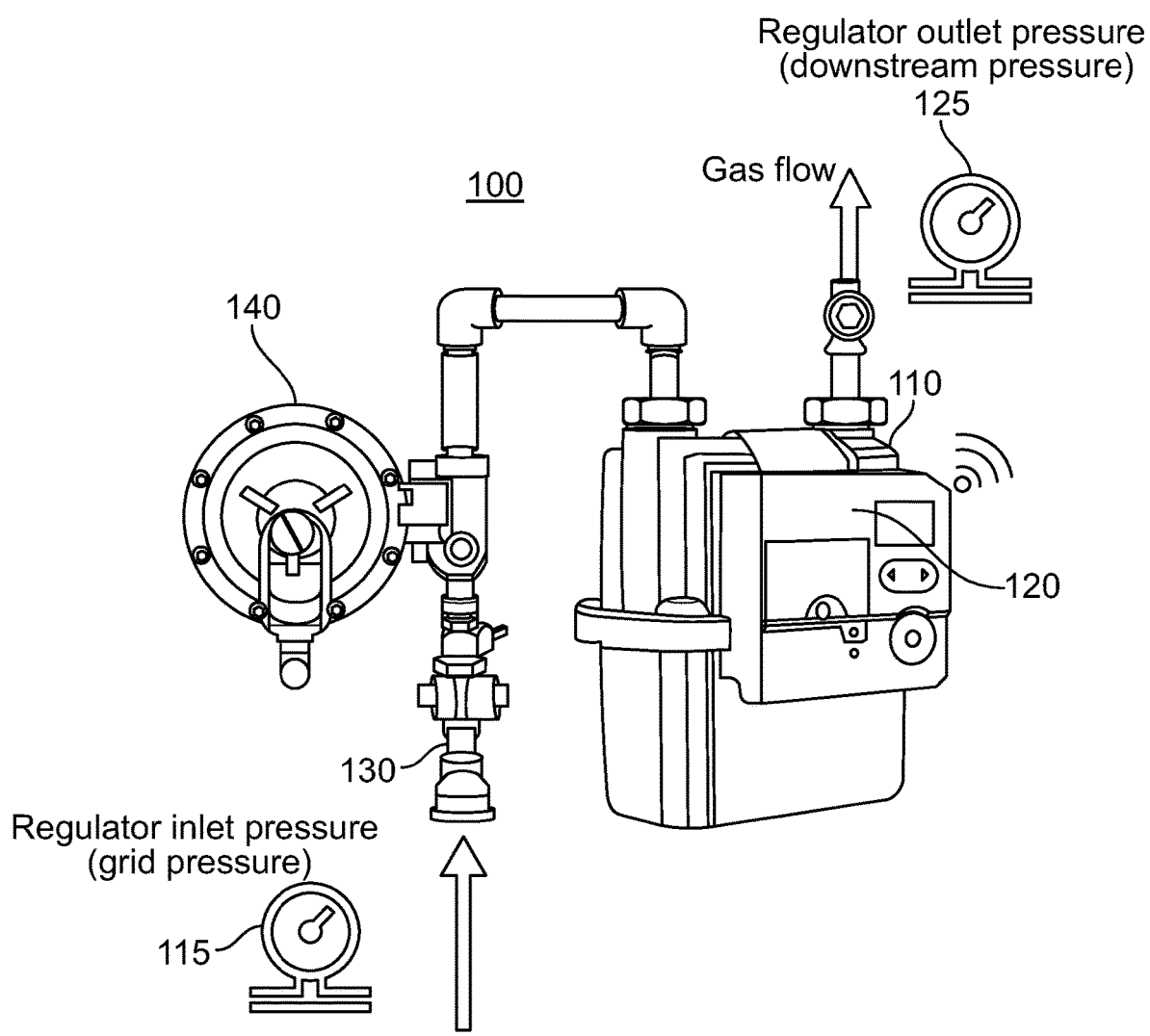
FIG. 1 illustrates gas meter and gas regulator in an embodiment of the invention.

Unless otherwise indicated illustrations in the figures are not necessarily drawn to scale.

DETAILED DESCRIPTION OF SOME EMBODIMENTS

Background and Context

The particular values and configurations discussed in these non-limiting examples can be varied and are cited merely to illustrate one or more embodiments and are not intended to limit the scope thereof.

Subject matter will now be described more fully herein after with reference to the accompanying drawings, which form a part hereof, and which show, by way of illustration, specific example embodiments. Subject matter may however, be embodied in a variety of different form and, therefore, covered or claimed subject matter is intended to be construed as not being limited to any example embodiments set forth herein, example embodiments are provided merely to be illustrative. Likewise, a reasonably broad scope for claimed or covered subject matter is intended. Among other issues, subject matter may be embodied as methods, devices, components, or systems. The followed detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as a "a," "an," or "the", again, may be understood to convey a singular usage or to convey a plural usage, depending at least in part upon context. In addition, the term "based on" may be understood as not necessarily intended to convey an exclusive set of factors and may instead, allow for existence of additional factors not necessarily expressly described, again, depending at least in part on context.

One having ordinary skill in the relevant art will readily recognize the subject matter disclosed herein can be practiced without one or more of the specific details or with other methods. In other instances, well-known structures or operations are not shown in detail to avoid obscuring certain aspects This disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Unless defined otherwise, all technical and scientific terms used herein have the same meanings as commonly understood by one of ordinary skill in the art to which the disclosed embodiments belong. Preferred methods, techniques, devices, and materials are described, although any methods, techniques, devices, or materials similar or equivalent to those described herein may be used in the practice or testing of the present invention.

Although claims have been included in this application to specific enumerated combinations of features, it should be understood the scope of the present disclosure also includes any novel feature or any novel combination of features disclosed herein.

References "an embodiment," "example embodiment," "various embodiments," "some embodiments," etc., may indicate that the embodiment(s) so described may include a particular feature, structure, or characteristic, but not every possible embodiment necessarily includes that particular feature, structure, or characteristic.

Headings provided are for convenience and are not to be taken as limiting the present disclosure in any way.

Each term utilized herein is to be given its broadest interpretation given the context in which that term is utilized.

Terminology

The following paragraphs provide context for terms found in the present disclosure (including the claims):

The transitional term "comprising", which is synonymous with "including," "containing," or "characterized by," is inclusive or open-ended and does not exclude additional, unrecited elements or method steps. See, e.g., Mars Inc. v. H. J. Heinz Co., 377 F.3d 1369, 1376, 71 USPQ2d 1837, 1843 (Fed. Cir. 2004) ("[L]ike the term 'comprising,' the terms 'containing' and 'mixture' are open-ended."). "Configured to" or "operable for" is used to connote structure by indicating that the mechanisms/units/components include structure that performs the task or tasks during operation. "Configured to" may include adapting a manufacturing process to fabricate components that are adapted to implement or perform one or more tasks.

"Based On." As used herein, this term is used to describe factors that affect a determination without otherwise precluding other or additional factors that may affect that determination. More particularly, such a determination may be solely "based on" those factors or based, at least in part, on those factors.

All terms of example language (e.g., including, without limitation, "such as", "like", "for example", "for instance", "similar to", etc.) are not exclusive of other examples and therefore mean "by way of example, and not limitation . . . ".

A description of an embodiment having components in communication with each other does not infer that all enumerated components are needed.

A commercial implementation in accordance with the scope and spirit of the present disclosure may be configured according to the needs of the particular application, whereby any function of the teachings related to any described embodiment of the present invention may be suitably changed by those skilled in the art.

The flowchart and block diagrams in the figures illustrate the architecture, functionality, and operation of possible implementations of systems and methods according to various embodiments. Functions noted in the block may occur out of the order noted in the figures. For example, two blocks shown in succession may in fact, be executed substantially concurrently, or the blocks may sometimes be executed in the reverse order, depending upon the functionality involved.

Further, any sequence of steps that may be described does not necessarily indicate a condition that the steps be performed in that order. Some steps may be performed simultaneously.

The functionality and/or the features of a particular component may be alternatively embodied by one or more other devices that are not explicitly described as having such functionality/features. Also, various embodiments of the present invention need not include a device itself.

Introduction

The present disclosure generally relates to a) measuring the inlet pressure at a gas regulator without adding a pressure sensor to this inlet, by using a pressure sensor and a flow sensor inside a gas meter that is connected to the outlet of the gas regulator, and b) how this can be used to identify failure modes of the gas regulator and c) how this can be used to localize leaks in the gas distribution network.

An estimated 1-10% of gas consumption is lost in a distribution grid and about 80% of this loss occurs in the ageing piping infrastructure. This drives global warming and explosion risk for human lives. Gas distribution utilities are challenged to improve operations for optimal energy usage & emissions and improved safety.

The gas distribution network (or gas grid) transports the gas to buildings (typically homes) at the end points of this network, where typically a gas regulator and a gas meter are positioned. The gas regulator reduces the grid pressure to a constant value needed for the safe operation of the gas appliances in the buildings. Its inlet is connected to the gas distribution pipeline and its outlet is connected to the gas meter. The gas meter measures the gas consumption of the building. Smart gas meters are equipped with a communication device to upload gas consumption data to the gas utility, typically for billing purposes. Gas meters can also be equipped with an internal pressure sensor and an internal temperature sensor to measure the gas pressure and gas temperature, respectively, of the gas that is flowing into the building.

An important parameter needed to localize leaks in the gas distribution network is the pressure at the endpoints of the distribution network, the grid pressure. This is the pressure at the inlet of the gas regulator. This parameter can also be used to identify valuable information on the health of the gas regulator: is it operating normally or is it leaking or venting and thereby creating an explosion hazard for the building.

Claims 1-4 form part 1 of the invention: use internal gas pressure sensor in the gas meter to derive grid pressure at the inlet of the regulator without adding an extra pressure sensor at the inlet of the regulator.

Claims 5-8 form part 2 of this invention: use internal pressure and temperature sensor inside the gas meter to identify failure modes of the regulator.

Claims 9-14 form part 3 of this invention: show how simultaneous grid pressure and flow measurements at the end-points of the gas distribution network, plus information on the pipeline topology of the gas distribution pipeline network, plus information on the input pressure and input flow to this distribution network, can be used to localize leaks.

A pressure sensor is configured within each gas meter. Each gas meter can derive the downstream pressure. As is demonstrated through this invention, the gas meters can derive the upstream pressure at the gas regulator inlet without the need for an additional pressure sensor on the inlet side of each gas regulator. The regulator inlet pressures will be derived according to either a first, second, or third algorithm. The gas utility will receive alerts from the gas meters regarding the consumption data and status information. Each gas meter will have a communication device that communicates with the gas utility system in response to a change of consumption data and status information. The gas utility system will use the alerts and status information to identify anomalies and erroneous output pressures. The gas utility system will also use the alerts and status information to identify venting among the gas regulators.

The temperature sensor will also be positioned within each gas meter. Each temperature sensor will measure changes and variances to gas temperatures at the end points to further identify leaking among the gas regulators. The pressure sensors being configured within the respective gas meter will enable the gas meters to detect changes and variances to the grid pressure.

The system will also include gas pressure stations feeding into a gas distribution network segment. The gas distribution network segment will include segment pipelines that lead into a plurality of buildings. Each of the buildings will have a respective gas meter and gas regulator. The location of one or more leaks in the gas distribution grid segment are derived by comparing simulated pressure and/or flow of end points of the gas distribution grid segment with the actual measured flow and upstream pressure of the end points of the gas distribution network segment. The difference between the simulated and measured grid pressure/flow will localize one or more leaks occurring in the segment pipelines.

Part 1: Use Internal Gas Pressure Sensor in the Gas Meter to Derive Grid Pressure at the Inlet of the Regulator FIG. 1 illustrates a system 100 with a gas meter 110 and gas regulator 140. Connected to the gas meter 110 is a utility communication device 120. Grid pressure, which is the inlet pressure to the regulator is shown as 115. Outlet pressure, or pressure going into the building is shown as 125, which can be measured with a sensor inside the gas meter 110. The system 100 also illustrates a grid connection point 130 at the inlet of the gas regulator 140. Gas flow occurs from the grid connection point 130 through the gas regulator 140, through the gas meter 110 to the building. The system 100 is typically is an end point of the gas distribution network and is connected to a building. In addition, each building within a neighborhood or city can include gas meters and gas regulators as is illustrated within the system 100.

Referring to FIG. 1, the gas meter 100 is configured to detect unwanted changes or variances in the inlet pressure at the grid connection point 130. The gas meter 100 measures gas consumption and/or gas flow that occur downstream from the gas regulator 140. In the system 100, the gas regulator 140 has an inlet that is connected to an upstream pipeline at the grid connection point 130 and an outlet connected to the gas meter 110. A pressure sensor and temperature sensor will be positioned within the gas meter 110. The pressure sensor inside the gas meter 110 will measure outlet pressure of the gas regulator 140. Using the pressure sensor positioned within the gas meter 110, the gas meter 110 will be able to derive upstream pressure that occurs at the grid connection point 130 without the need for an additional pressure sensor on the grid connection point 130. Moreover, the gas meter 110 can derive the upstream pressure by combining the measured gas flow and a measured outlet flow with a characterization curve of the gas regulator 140 by showing a relation between input pressure to the outlet pressure and to the gas flow. Regulator inlet pressures can be derived by the gas meter 110 according to a first, second, or third algorithm. The position of the pressure sensor within the gas meter 110 will enable the gas meter 110 to detect changes and variances to the grid pressure that occurs upstream from the gas regulator 140.

In FIG. 1, the communication device 120 attached to the gas meter 110, communicates with a gas utility system positioned at end points of the system 100. The gas utility system receives alerts in relation to the consumption data and status information from the gas meter 110. The communication device 120 can be positioned within the gas meter 110 in one or more embodiments. In other embodiments, the communication device 120 can be positioned on the gas meter 110. The communication device 120 can receive information on the gas meter 110 in relation to consumption data and status information, and communicate that information to the gas utility system. The communication device 120 will alert the gas utility system of changes to consumption of data and status information.

Figure 2:
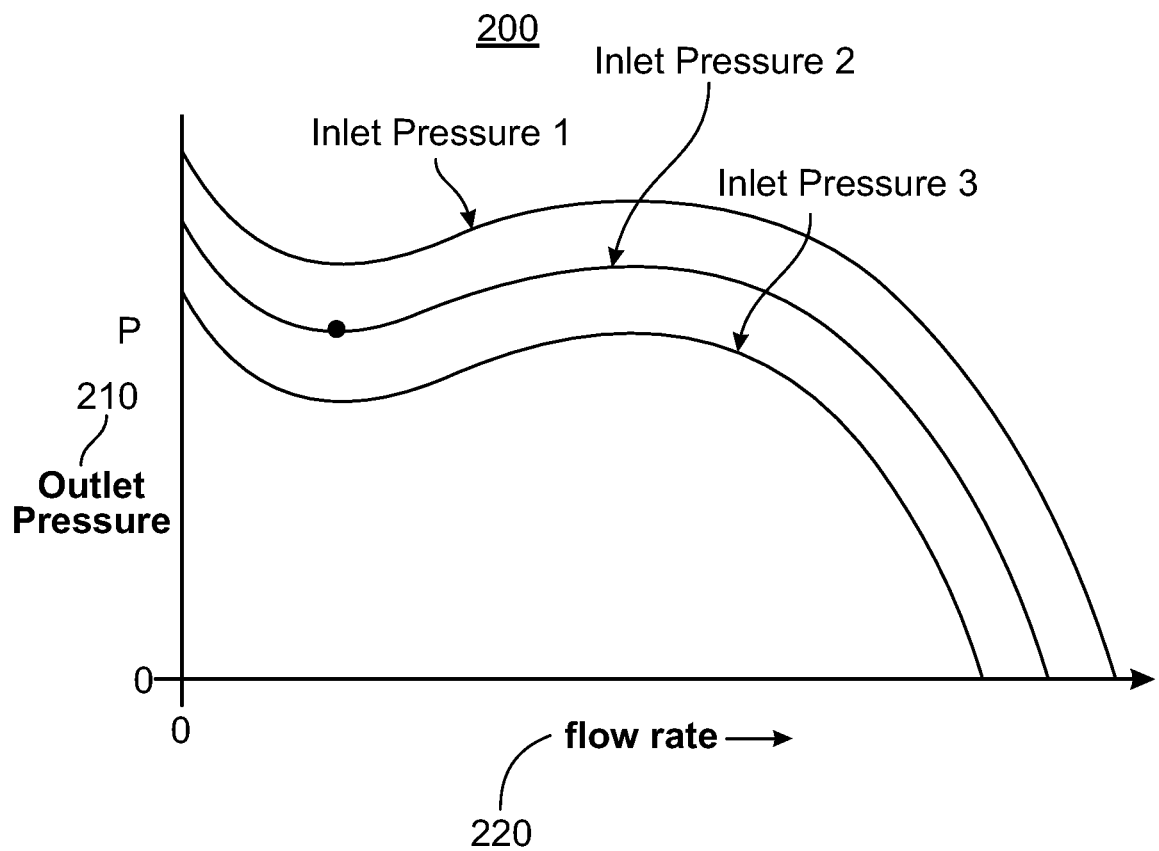
FIG. 2 illustrates a graph of outlet pressure and flow rate in an embodiment of the invention.

Referring to FIG. 2, a graph 200 of a characterization curve is illustrated. The characterization curves illustrates the relation between outlet pressure 210 and flow rate 220 at various inlet pressures 1, 2, 3 The outlet pressure 210 can be the outlet pressure around the gas regulators within the system. The flow rate is the gas flow that flows from the grid downstream from the regulators and into the building. As mentioned above, a pressure sensor will be positioned within each gas meter within the system. As such, the gas meter will be able to derive upstream pressure without an additional pressure sensor on an inlet side of each gas regulator within the system. Moreover, the measured gas flow and outlet flow will be combined with the characterization curve of the gas regulators that shows a relationship between the outlet pressure 210, flow rate 220, and inlet pressure.

Figure 4:
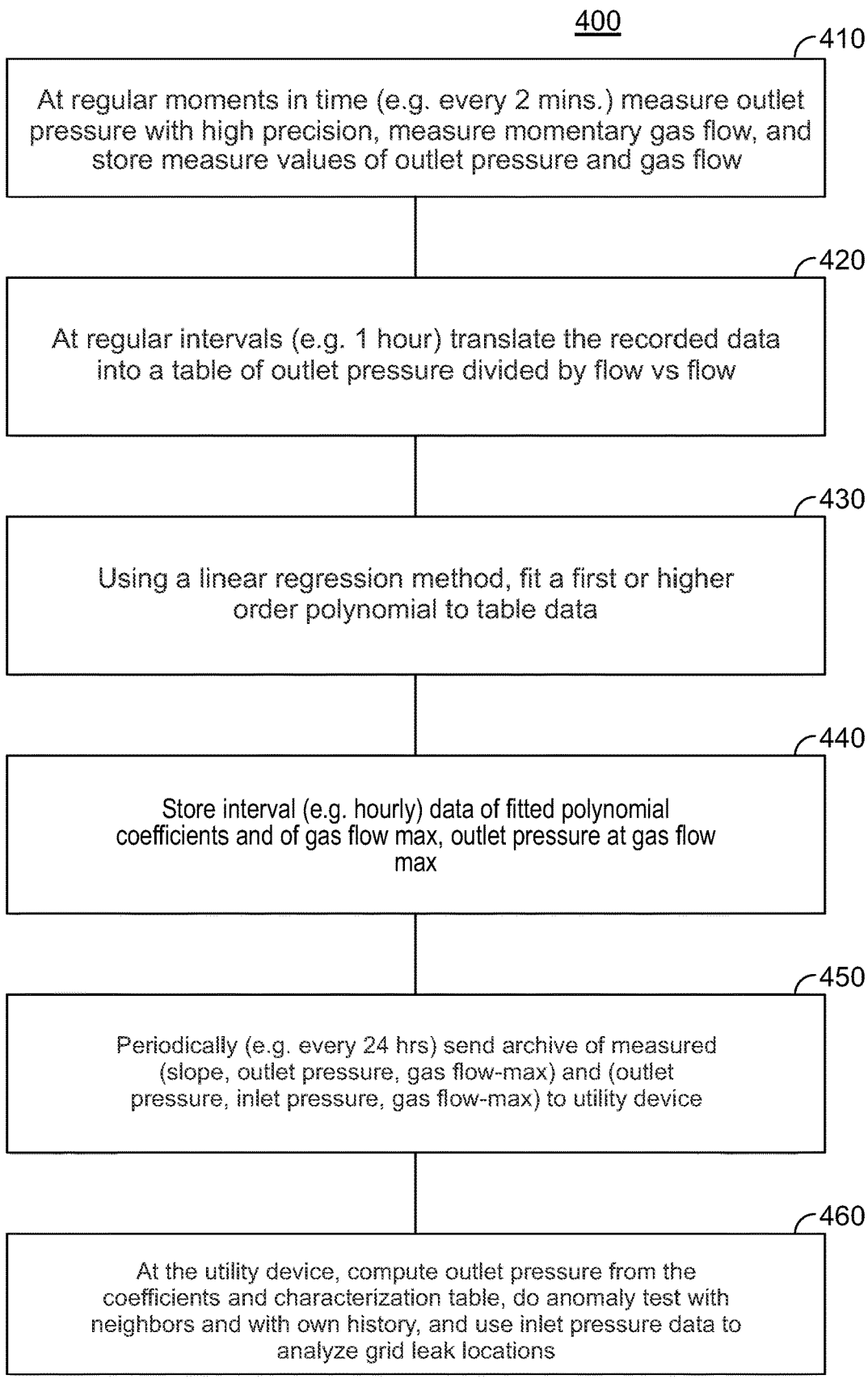
FIG. 4 illustrates a flowchart of a second algorithm in accordance with an embodiment of the invention.

The next set of FIGS. 3-5 will illustrate first, second, and third algorithms respectively. Each of the algorithms represent algorithms to ultimately identify inlet pressure by collecting measures of output pressure and output flow and by using the characterization table to derive inlet pressure.

Referring to FIG. 3, a flowchart 300 is illustrated that describes the first algorithm. At step 310, a gas meter downloads a regulator characterization table. The regulator characterization table will include a comparison to the outlet pressure versus the flow versus the inlet pressure. The inlet pressure is the grid pressure that occurs upstream from each of the gas regulators. The inlet pressure can also be known as the grid pressure. The outlet pressure is the pressure that occurs downstream from the gas regulators and toward the homes within the system. The dynamic flow can be the gas flow as measured by the gas meter. At step 320, at regular moments in time, (e.g. 2 minutes as an example), the outlet pressure is measured along with the momentary gas flow. The gas meter also interpolates the characterization table that has been downloaded to find the value for the inlet pressure or grid pressure. Further, at step 330, the gas meter archives measured values of the outlet pressure, inlet/grid pressure, and gas flow combinations at a set time interval. The set time interval can be up to, but is not limited to, one hour in one or more embodiments. In addition, each gas meter can archive measured values of the outlet pressure, inlet/grid pressure, and gas flow combinations at a maximum flow during the same set time interval. At step 340, each gas meter periodically (e.g. 24 hours as an example) will send the archive of the measured outlet pressure, inlet/grid pressure and gas flow at both the minimum and maximum flow to the gas utility system. The gas utility system will receive the archive measurements and perform an anomaly test to identify if one or more leaks have occurred within the system and identify if the regulator is working as intended.

In FIG. 4, a flowchart 400 illustrating the second algorithm is illustrated. As with the first algorithm, the second algorithm will enable grid pressure to be measured at the inlet of the gas regulators in the system. At step 410, at regular moments in time (2 minutes as an example), each gas meter will measure the outlet pressure, momentary gas flow, and store measured values of the outlet pressure and gas flow. At step 420, at regular intervals (1 hour as an example), each gas meter will translate the recorded data into a table of outlet pressure divided by the gas flow versus the flow. Further, at step 430, a linear regression method is then utilized. A first or higher order polynomial is fitted to table data. At step 440, each gas meter stores interval (hourly in one or more embodiments) data of the fitted polynomial coefficients and of the gas flow and outlet pressure at the maximum flow. At step 450, each gas meter periodically (twenty-four hours as an example), sends archived measurements of the slope, outlet pressure, and maximum gas flow and also archived measurements of the outlet pressure, inlet pressure, and maximum gas flow to the gas utility system. Then, at step 460, the gas utility system computes the outlet pressure from the coefficients and characterization table. The gas utility system also performs an anomaly test with the neighbors in the system and its own history. The gas utility system also uses the inlet pressure data to analyze the one or more grid leak locations within the system and identify if the regulator is working as intended.

In FIG. 5, a flowchart 500 illustrates a third possible algorithm to enable the utility system to identify one or more leaks within the system. At step 510, each gas meter will download a characterization table of a step-flow of outlet pressure response curves to the gas meter. The curves will include pressure versus time versus delta flow. Then, at step 520, each gas meter will detect a step change in gas consumption when a burner starts or stops. At step 530, each gas meter will measure the dynamic response curve of the outlet pressure versus time to the step-change in the gas consumption. The response curve will depend on the inlet/grid pressure. At step 540, each gas meter will interpolate in the characterization table to find the value of the inlet pressure or grid pressure. The gas utility system also uses the inlet pressure data to analyze the one or more grid leak locations within the system and identify if the regulator is working as intended.

Part 2: Use Regulator Inlet- and Outlet Pressure Data to Identify Failure Modes of the Regulator Referring to FIG. 1, the gas utility system will use the alerts and status information that it receives from the communication device to identify when the gas regulator 140 has erroneous input or output pressure. The input pressure of the gas regulator 140 will be compared to other gas regulators in the gas distribution network to detect any anomalies. The one or more anomalies will include leaks in and around the gas regulator 140. The anomalies will also include venting around the gas regulator 140. As mentioned above, a temperature sensor will be positioned within the gas meter 110. The temperature sensor will also measure changes and variances to gas temperatures at the end points of the system 100. The temperature sensor will measure the changes and variances to further identify leaking around the gas regulator 140 by calculating a pressure increase that is caused by a temperature increase of gas in a pipe segment or grid 130 downstream from the gas regulator 140. Within the system 100, the calculating of the pressure increase of the gas regulator 140 includes monitoring whether the gas temperatures are not rising while the pressure is increased at zero consumption.

Figure 6:
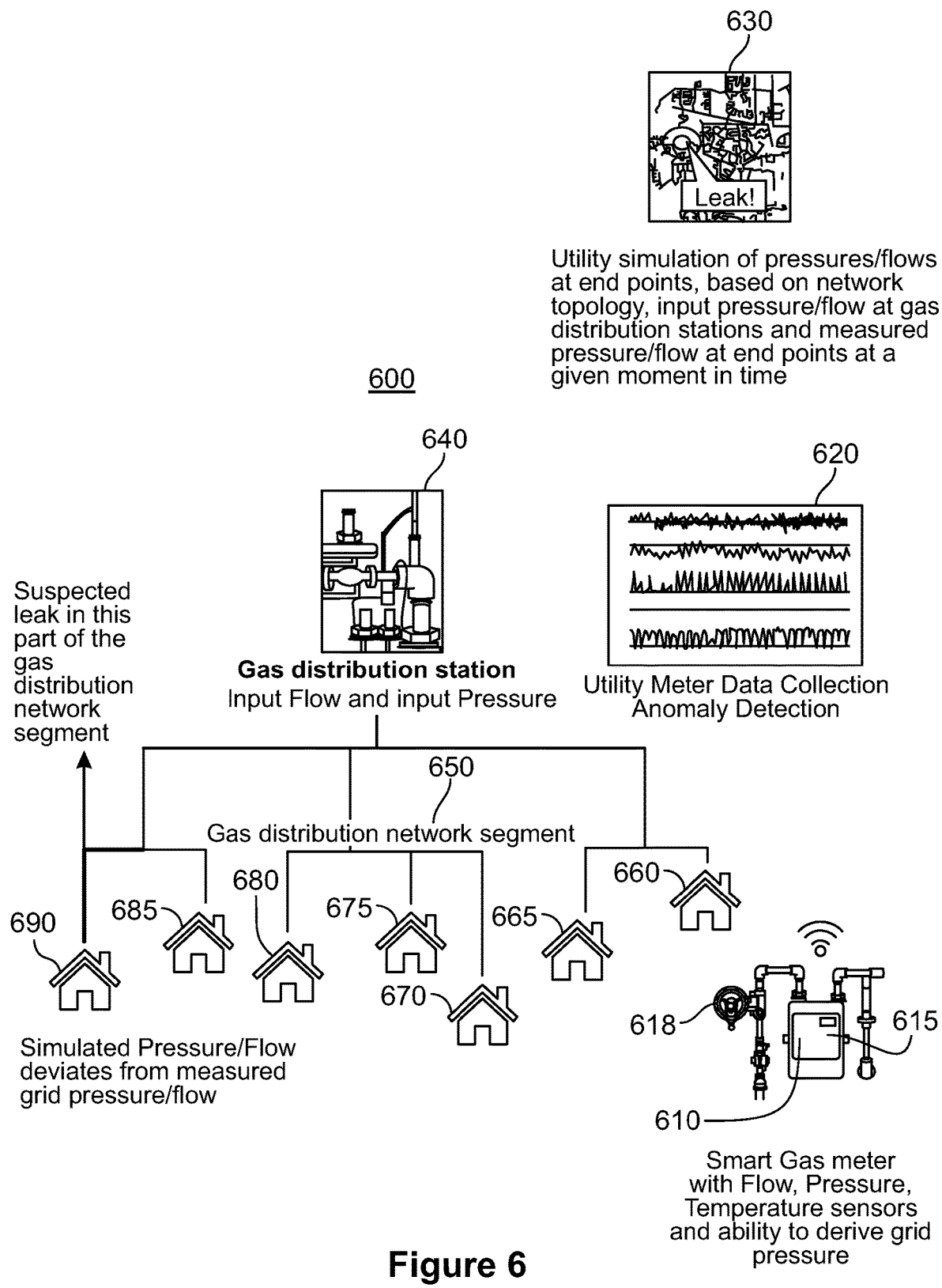
FIG. 6 illustrates a system of gas meters and gas regulators within homes in an embodiment of the invention.

In FIG. 6, a system 600 is illustrated that shows a gas distribution network segment 650 with buildings 660, 665, 670, 675, 680, 685, 690 connected to it, each equipped with a gas meter 610, a communication device 615 and a gas regulator 618. In addition, a gas utility system 620 and utility simulation 630 are shown. The gas is fed into the gas distribution network 650 by a gas distribution station 640. The gas meter 610, through the communication device 615, will alert the gas utility system or utility meter data collector 620 of the captured readings. The gas utility system 620 will perform anomaly tests to identify leaks or incorrect operation of each regulator 618. In addition, the system 600 also includes the utility simulation 630. The utility simulation 630 includes pressures/flows at end points based on network topology. The utility simulation 630 is also based on input pressure/flow at gas distribution stations and measured pressures/flows at end points at given moments in time.

Referring to FIG. 6, each gas meter 610 is configured to measure the gas consumption and gas flow for each gas regulator 618. Each gas regulator 618 is configured with an inlet connected to an upstream pipeline and an outlet connected to each gas meter 610. A pressure sensor is positioned within each gas meter 610 to measure outlet pressure of the gas regulator 618 in each home 660, 665, 670, 675, 680, 685, and 690. A temperature sensor is also positioned within each gas meter 610 as well. Regulator inlet pressures are derived according to a first algorithm, second, algorithm or third algorithm as described above in FIGS. 3-5.

In FIG. 6, in relation to the first algorithm, each gas meter 610 will download a characterization table. Each gas meter 610 will also measure outlet pressure and momentary gas flow. Each gas meter 610 will also interpolate in the characterization table to find the value for the inlet pressure or grid pressure. Each gas meter 610 will also archive measured values of the outlet pressure, inlet pressure and gas flow combinations at set time intervals at a minimum and maximum flow. Periodically, each gas meter 610 will send the archive measurements to the utility system 620 via the communication device 615 to enable the utility system 620 to determine if any leaks have occurred.

Referring to FIG. 6, with respect to the second algorithm, each gas meter 610 will measure the outlet pressure and momentary gas flow, and store the measured values of the outlet pressure and momentary gas flow. Each gas meter 610 will also periodically send archive measurements of slope, outlet pressure and gas flow and also archive measurements of outlet pressure, inlet pressure, and gas flow to the gas utility system 620 via the communication device 615. The gas utility system 620 will compute the outlet pressure from the coefficients and characterization table. The gas utility system 620 will also perform an anomaly test with neighbors and its own history. Further, the gas utility system 620 will use the grid pressure/inlet pressure data to analyze the grid leak locations.

In FIG. 6, in relation to the third algorithm, each gas meter 610 will download the characterization table of step-flow outlet pressure response curves. Each gas meter 610 will also detect a change in flow when a burner or another high gas consumption device either starts or stops. Further, each gas meter 610 will measure a dynamic response curve of outlet pressure versus the step-change in gas consumption. Finally, each gas meter 610 will interpolate in the characterization table to find the value for the inlet/grid pressure.

Referring to FIG. 6, the gas utility system 620 will receive alerts in relation to consumption data and status information from each gas meter 610. Status information can include grid pressure, outlet pressure and gas temperature. Each communication device 615 will be integrated within or connected to each gas meter 610. Further, each communication device 615 is able to communicate and alert the gas utility system 620 in response to a change of consumption data and status information. The gas utility system 620 uses the alerts and status information from each gas meter 610 to identify when each gas regulator 618 have erroneous output pressure by detection of anomalies of the gas regulators 618 in comparison to the gas regulators at the other end points in the gas distribution network. In addition, the gas utility system 620 uses the alerts and status information of each gas meter 610 to identify venting among each gas regulator 618 by detection of anomalies in the gas regulators 618 in comparison to the gas regulators at the other end points in the gas distribution network Each temperature sensor within each gas meter 610 measures changes and variances to the gas temperatures at the end points to further identify leaking among the gas regulators 618. Internal leaking of a regulator 618 will be identified by calculating a pressure increase caused by a temperature increase of gas in a pipe segment that is downstream from the gas regulators 618. And compare that with the observed outlet pressure increase at zero or minimal flow.

Part 3: Localize Leaks in the Gas Distribution Network

Referring to FIG. 6, The gas distribution station 640 feed gas with known flow and pressure into the gas distribution network segment 650. The gas distribution network segment 650 includes pipelines with a known geometry and topology. A synchronized measurement of grid pressure/flow at end points 660-690 that consume gas from the gas distribution network segment 650 is taking place. A location of one or more leaks in the gas distributed network segment 650 is derived. The darkened portion of the pipe segment in between the homes 685 and 690 indicates a leak in the pipeline segment that can occur. Moreover, the one or more leaks are derived by comparing simulated pressures and/or gas flow of end points of the gas distribution network segment 650 with the measured flow and upstream pressure of the end points of the gas distribution network segment 650. A simulation will be completed by a computational fluid dynamics (CFD) flow computation. The synchronized measurement of the inlet pressure/grid pressure/gas flow includes synchronization through a central coordination or synchronization at periodic set times. A difference between the simulated and measured pressure/flow will increase a likelihood of one or more leaks occurring. A large deviation between the simulated and measured pressure/flow will increase the likely occurrence of one or more leaks within the system 600.

In FIG. 7, a process 700 is illustrated that leads to reporting a potential leak within a pipe segment of the gas distributed network segment. At step 710, the inlet/grid pressure and dynamic flow from the gas meters in the gas distribution grid will be collected at a synchronized moment in time. The gas utility system will collect the inlet/grid pressures and the dynamic flow values from each gas meter in the gas distribution grid. At step 720, the inlet pressure and inlet from the gas distribution station(s) is collected. The gas utility system will also collect the grid/inlet pressure and inlet flow from the gas distribution station. Next, at step 730, the gas utility system will compute the simulated flow or inlet pressure at end points in the network. The simulated flow or inlet pressure will be computed by feeding the inlet pressures or flow at a gas meter, and also feeding the inlet pressures and flows from the gas distribution station/stations into a CFD simulation of the gas distribution network. The topology and geometry data of all the piping will also bee entered. The gas utility system will compute the simulated flow at the end points in the network. At step 740, the gas utility system will look for gas meters in the network with a large deviation between the simulated flow and report. In other words, the gas utility system will look for a large deviation between the simulated inlet pressure and reported inlet pressure. The large deviation will indicate one or leaks within the pipe segments in the system in the segment close to that end point. At step 750, the gas utility system will report a potential leak in a pipe segment to a gas meter. Moreover, the gas utility system will report any potential leaks in pipe segments to the appropriate gas meter.

Those skilled in the art will appreciate that the example embodiments are non-exhaustive and that embodiments other than that described here may be included without departing from the scope and spirit of the presently disclosed embodiments.

Summary

In a network, gas meters and gas regulators can be situated within a plurality of homes. Each home in the network will have a respective gas meter and gas regulator. The gas tribute network segment can provide the segment pipelines that feed into each of the homes. The gas distribution station/stations can provide the input flow and pressure that feeds into the segment pipelines. The gas meter in each home will measure the gas consumption and gas flow downstream for each regulator. Each gas regulator is configured with an inlet connected to an upstream pipeline and an outlet connected to the respective gas meter. Each of the gas meters will have a pressure sensor and temperature sensor configured inside of each gas meter. Each gas meter is able to derive the upstream pressure without requiring an additional pressure sensor on an inlet side of the gas regulator. In addition, each gas meter can derive the regulator inlet pressure/grid pressure according to either the first, second, or third algorithm. The position of each pressure sensor enables each gas meter to detect changes and variances to the grid pressure. The temperature sensor is positioned within each gas meter to measure changes and variances to gas temperatures at the end points to further identify leaking among the gas regulators. Each temperature sensor will also calculate a pressure increase caused by a temperature increase of gas in a pipe segment downstream from the regulators. Moreover, the calculating of the pressure increase will include monitoring whether the gas temperatures are not rising while the pressure is increasing at zero consumption.

The gas utility system will be positioned at end points of the system. The gas utility system will receive the alerts from each gas meter in relation to consumption data and other status information. Each gas meter will have a communication device configured on an outside portion of the gas meter. The communication devices will communicate with the gas utility system and alert the gas utility system in response to a change of consumption data and status information. The gas utility system will use the alerts and status information from each gas meter to identify when the gas regulators have erroneous output pressures. The gas utility system will detect anomalies in the gas regulators in comparison to the gas meters. In addition, the gas utility system also uses the received alerts and status information form the gas meters to identify when venting occurs among the gas regulators. The gas utility system will detect the venting by identifying the anomalies in the gas regulators in comparison to the gas meters.

The gas distribution pressure station/stations will have a known flow and pressure that feed into a gas distributed network segment. The gas distribution network segment will include pipelines with a known geometry and topology with a synchronized measurement of grid pressure/flow at end points that are consumed by the gas distributed network segment. A location of one or more leaks in the gas distributed network segment are identified by the gas utility system by comparing the simulated pressure and/or flow of end points of the gas distributed network segment with the measured flow and upstream pressure of the end pints of the gas distributed network segment. The simulation will be completed by a CFD flow computation. The synchronized measurement of the grid pressure/flow will include synchronization through a central coordination or synchronization at periodic set times. The difference between the simulated and measured grid pressure will increase the likelihood of a leak occurring in the pipelines.

CONCLUSION

All references, including granted patents and patent application publications, referred herein are incorporated herein by reference in their entirety.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Various aspects of the invention have been described above by way of illustration, and the specific embodiments disclosed are not intended to limit the invention to the particular forms disclosed. The particular implementation of the system provided thereof may vary depending upon the particular context or application. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

The corresponding structures, materials, acts, and equivalents of all means or step plus function elements in the claims below are intended to include any structure, material, or act for performing the function in combination with other claimed elements as specifically claimed.

The invention claimed is:

1. A system comprising:
    a gas meter configured to measure gas consumption/gas flow downstream for a gas regulator;
    the gas regulator configured with an inlet connected to an upstream pipeline and an outlet connected to the gas meter; and
    a pressure sensor positioned within the gas meter to measure outlet pressure of the gas regulator, wherein the gas meter is able to derive upstream pressure without an additional pressure sensor on an inlet side of the gas regulator by combining the measured gas flow and a measured regulator outlet pressure with a characterization curve of the gas regulator showing a relation between input pressure to the outlet pressure and to the gas flow.

2. The system of claim 1, wherein regulator inlet pressures are derived according to a first algorithm before a second or third algorithm.

3. The system of claim 1, wherein regulator inlet pressures are derived according to a second algorithm in place of a first algorithm.

4. The system of claim 1, wherein regulator inlet pressures are derived according to a third algorithm in place of a first or second algorithm.

5. The system of claim 1, further comprising:
    a gas utility system positioned at end points of the system that receives alerts in relation to consumption data and status information from the gas meter; and
    a communication device integrated within or connected to the gas meter, wherein the communication device is able to communicate and alert the gas utility system in response to a change of consumption data and changes and variances to the grid pressure at the end points.

6. The system of claim 5, wherein the gas utility system uses the alerts and status information of the gas meter and additional gas meters to identify when the gas regulator and additional gas regulators have wrongly set or erroneous output pressures by detection of anomalies in the gas regulator output pressure in comparison to other gas regulators in the gas distribution network.

7. The system of claim 5, wherein the utility gas system uses alerts and status information of the gas meter and additional gas meters to identify venting among the gas regulator and additional gas regulators by detection of anomalies in the gas regulators in comparison to other gas regulators in the gas distribution network.

8. The system of claim 5, further comprising:
a temperature sensor positioned within the gas meter to measure changes and variances to gas temperatures at the end points to identify internal leaking of the gas regulator and other gas regulators, whereby pressure is building up downstream of the regulator if the gas consumption is lower than the size of the leak which causes an explosion hazard for the gas consumer, by calculating a pressure increase caused by a temperature increase of gas in a pipe segment downstream from the regulators and comparing that with the observed pressure increase: if the observed pressure increase is larger than the expected pressure increase due to temperature increase, an unsafe situation is developing.

9. The system of claim 5, further comprising:
gas distribution pressure stations with known flow and pressure feeding into a distribution network segment;
gas distribution network segment pipe lines with a known geometry and topology with a synchronized measurement of grid pressure/flow at end points that are consumed from the distribution network segment, wherein a location of one or more leaks in a gas distribution grid segment are derived by comparing simulated pressure and/or flow of endpoints of the gas distribution grid segment with measured flow and upstream pressure of the end points of the distribution network segment.

10. The system of claim 9, wherein a simulation is completed by a computational fluid dynamics (CFD) flow computation.

11. The system of claim 9, wherein the synchronized measurement of the grid pressure/flow includes synchronization through a central coordination or synchronization at periodic set times.

12. The system of claim 9, wherein a difference between the simulated and measured pressure/flow will increase a likelihood of a leak occurring.

13. A method comprising:
configuring a gas meter to measure gas consumption/gas flow downstream for a gas regulator;
positioning the gas regulator with an inlet connected to an upstream pipeline and an outlet connected to the gas meter; and
configuring a pressure sensor within the gas meter to measure outlet pressure of the gas regulator, wherein the gas meter is able to derive upstream pressure without an additional pressure sensor on an inlet side of the gas regulator by combining the measured gas flow and a measured regulator outlet pressure with a characterization curve of the gas regulator showing a relation between input pressure to the outlet pressure and to the gas flow.

14. The method of claim 13, further comprising:
positioning a temperature sensor within the gas meter to measure changes and variances to gas temperatures at the end points to further identify leaking among the gas regulator and other gas regulators.

15. The method of claim 13, further comprising:
setting gas distribution pressure stations with known flow and pressure feeding into a distribution network segment.

16. The method of claim 13, further comprising:
positioning gas distribution network segment pipe lines with a known geometry and topology with a synchronized measurement of grid pressure/flow at end points that are consumed from the distribution network segment, wherein a location of one or more leaks in a gas distribution grid segment are derived by comparing simulated pressure and/or flow of endpoints of the gas distribution grid segment with measured flow and upstream pressure of the end points of the distribution network segment.

17. The method of claim 13, further comprising:
monitoring whether the gas temperatures are not rising while the pressure is increasing at zero consumption.

18. The method of claim 13, further comprising:
deriving regulator inlet pressures according to a first, second, or third algorithm.

19. The method of claim 13, further comprising:
deriving regulator inlet pressures according to a second algorithm in place of a first algorithm.

20. The method of claim 13, further comprising:
deriving regulator inlet pressures according to a third algorithm in place of a first or second algorithm.

* * * * *